No. 764,001. PATENTED JULY 5, 1904.
C. R. NICHOLS.
ANIMAL POKE.
APPLICATION FILED SEPT. 15, 1903.
NO MODEL.
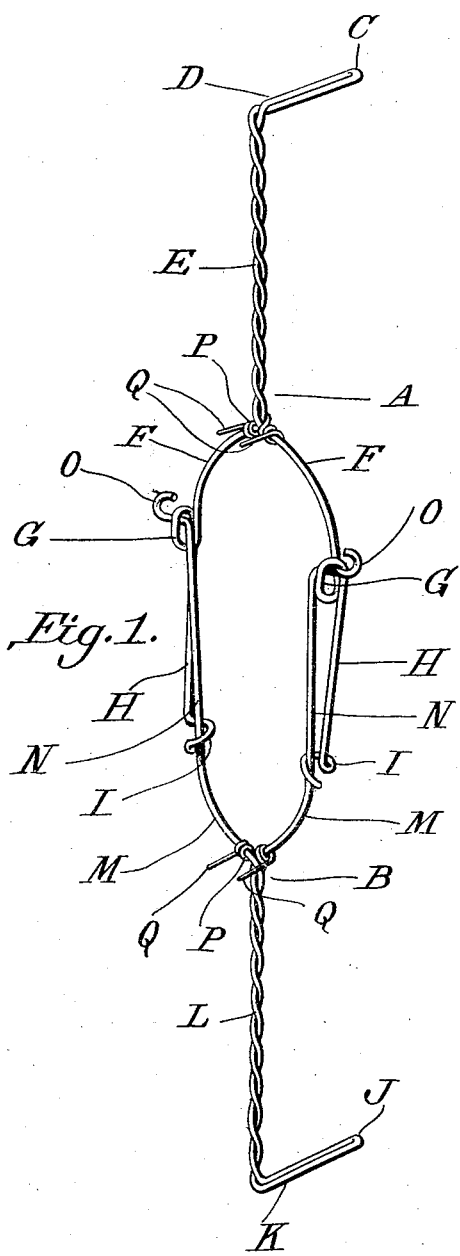
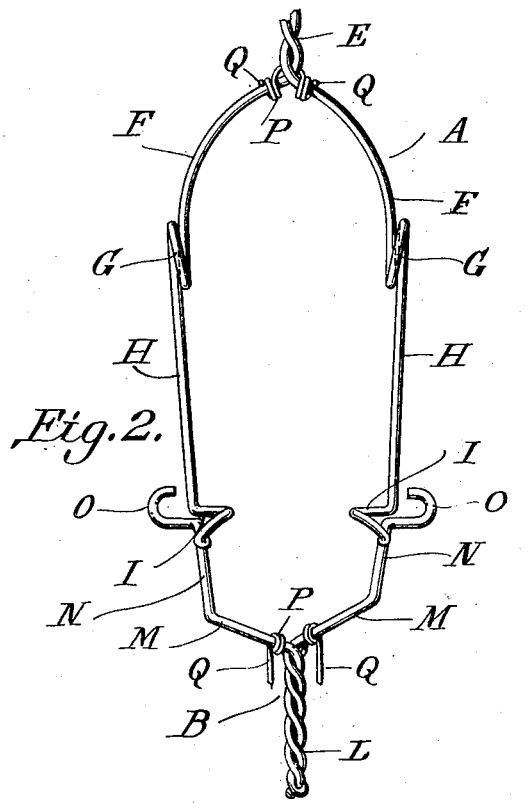
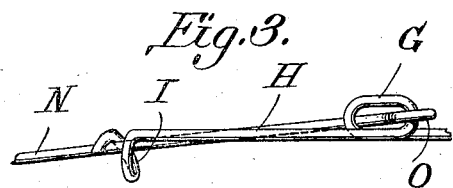
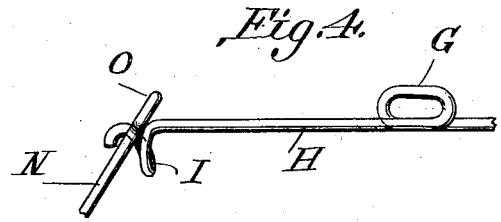
Chester R. Nichols, Inventor.

No. 764,001.

Patented July 5, 1904.

UNITED STATES PATENT OFFICE.

CHESTER R. NICHOLS, OF CLEO, OKLAHOMA TERRITORY.

ANIMAL-POKE.

SPECIFICATION forming part of Letters Patent No. 764,001, dated July 5, 1904.

Application filed September 15, 1903. Serial No. 173,310. (No model.)

*To all whom it may concern:*

Be it known that I, CHESTER R. NICHOLS, a citizen of the United States, residing in Cleo, in the county of Woods and Territory of Oklahoma, have invented certain new and useful Improvements in Animal-Pokes, of which the following is a specification.

My invention relates to devices for preventing cattle, horses, mules, &c., from passing through fences; and it consists of a yoke made in two parts that are easily and quickly applied to and removed from the animal's neck and having extensions that intercept the line-wire or horizontal rails of fences. There are also provided above and below the yoke sharp-pointed barbs or spurs that penetrate the flesh of the animal when it attempts to pass a barrier and cause it to withdraw therefrom.

The operation and advantages of my invention will fully appear hereinafter and by reference to the accompanying drawings, in which—

Figure 1 is a view in perspective of my invention, showing it in an assembled position. Fig. 2 is a view showing it in a partly-unassembled position; Fig. 3, a fragmental side view showing the parts assembled, and Fig. 4 a similar view in an unassembled condition.

In the drawings similar reference characters indicate corresponding parts throughout the several views.

My invention is made, preferably, of steel wire and consists of two parts forming the yoke, the upper part being designated by the letter A and the lower part by the letter B and each formed of a single strand of the wire. The part A is bent in its center, as shown at C, and extended rearwardly, as shown at D. The two strands are then bent downwardly at right angles to the part D and twisted on themselves to form a vertical portion E. Parts D and E may be of any desired length. At the end of vertical portion E the two strands of the wire are bent outwardly and curve downwardly, as shown at F, to form the rider of the yoke, then twisted to form loops G, then carried vertically downward, as shown at H, and their extreme ends then bent to form inwardly-extending horizontal open loops I. The lower part of B is also bent in its center, as shown at J, and the two strands extended rearwardly, as at K, and then bent upwardly at right angles to K and twisted on themseves to form a vertical portion L. As shown in the drawings, the portions E and L are substantially the same length; but it may be found desirable to make the portion L relatively shorter than E to keep it from interfering with the animal when grazing, and I do not, therefore, confine myself to the proportions shown, this not being an essential feature of my invention.

At the upper end of part L the two strands of wire are bent away from one another and curved outwardly and upwardly, as shown at M, to form the throat of the yoke and then extended substantially vertically upward, as shown at N, and have their ends bent outwardly and their ends curved upwardly to form hooks O.

In assembling the two parts the straight portions N are inserted in the open loops I and then pressed toward each other to permit the hooks O to enter the loops G, which when the pressure is removed are held therein by the resilience of said portions M. The poke is removed by reversing the operation just described.

It will be understood that when worn by an animal the parts D and E and K and L will intercept the line-wires of a wire fence, the rails of a horizontal-rail fence, or the bars of a picket-fence and prevent the animal's passage therethrough. It will also be seen that the hook-like form of these parts will make either part effective in operation to the exclusion of the other. In order, however, to make the device more effective in operation, I provide spurs or barbs P, consisting of pieces of steel wire wrapped around the two parts A and B, one at the lower end of portion E and the other at the upper end of portion L, and having their ends Q extended rearwardly and slightly downwardly and upwardly, respectively, and sharpened. These spurs will enter the flesh of the animal and cause it to withdraw its head from the barrier.

Having thus described my invention, what I claim is—

1. In an animal-poke a yoke formed of two parts, one of said parts having loops on its sides, the other part having hooks to register with said loops, and means to prevent said parts from swinging relative to one another, substantially as shown and described.

2. In an animal-poke, a yoke formed of two parts vertically arranged, the upper part having loops on its sides, the lower part having hooked ends to register with said loops, and means to prevent said parts from swinging relative to one another, substantially as shown and described.

3. In an animal-poke, a yoke formed of two parts, one of said parts having closed loops on its sides and open loops on its ends, and the other part having straight sides to insert in said open loops, and hooked ends to register with said closed loops, substantially as shown and described.

4. In an animal-poke, a yoke formed of two parts vertically arranged, the upper part having closed loops on its sides and inwardly-extending open loops on its ends, and the lower part having vertical portions to insert in said open loops and reciprocate therein, and hooks on the upper ends of said vertical portions to register with said closed loops, substantially as shown and described.

5. In an animal-poke, two separable and replaceable parts, one of the said parts having an inverted-U-shaped portion forming the rider of a yoke, and an angular portion thereabove, the sides of the inverted-U-shaped portion having loops therein, the other of said parts having a U-shaped portion forming the throat of the yoke, the ends of said U-shaped portion having hooks to register with the loops aforesaid, and an angular portion extending downwardly from said U-shaped portion, substantially as shown and described.

6. In an animal-poke, two separable and replaceable parts, one of said parts having an inverted-U-shaped portion forming the rider of a yoke, and an angular portion thereabove, the sides of the inverted-U-shaped portion having loops therein, the other portion having a U-shaped portion forming the throat of the yoke, the ends of said U-shaped portion having hooks to register with the loops aforesaid, and an angular portion extending downwardly from said U-shaped portion, and spurs or barbs formed at the ends of said angular portions, substantially as shown and described.

In testimony whereof I hereunto affix my signature in the presence of two witnesses.

CHESTER R. NICHOLS.

Witnesses:
 EMMA FLEMING,
 J. M. SNEDEKER.